United States Patent [19]

Mikofalvy et al.

[11] Patent Number: 4,939,212

[45] Date of Patent: Jul. 3, 1990

[54] ELASTICIZED VINYL DISPERSION RESINS HAVING OUTSTANDING STORAGE STABILITY

[75] Inventors: Bela K. Mikofalvy, Avon Lake; David J. Poledna, Grafton, both of Ohio

[73] Assignee: The B. F. Goodrich Company, Akron, Ohio

[21] Appl. No.: 332,672

[22] Filed: Mar. 31, 1989

[51] Int. Cl.$^5$ ............................................. C08F 267/02
[52] U.S. Cl. ....................................... 525/301; 525/271; 525/308; 525/317; 526/318.2
[58] Field of Search .................... 525/301, 308, 317; 526/271, 318.2

[56] References Cited

U.S. PATENT DOCUMENTS

| | | | |
|---|---|---|---|
| 3,334,156 | 8/1967 | Calentine et al. | 260/884 |
| 3,502,640 | 3/1970 | Nakatsuka et al. | 260/29.6 |
| 3,632,679 | 1/1972 | DeWitt et al. | 260/878 R |
| 3,657,172 | 8/1972 | Gallagher et al. | 260/29.6 RB |
| 3,660,529 | 5/1972 | Groch | 260/876 R |
| 3,760,035 | 9/1973 | Kelley | 260/876 R |
| 3,763,279 | 10/1973 | Kelley | 260/884 |
| 3,808,180 | 4/1974 | Owens | 525/291 |
| 3,832,318 | 8/1974 | Gallagher et al. | 260/29.7 UP |
| 3,851,016 | 11/1974 | Nicolet et al. | 525/317 |
| 4,390,672 | 6/1983 | Von Bonin | 526/271 |

FOREIGN PATENT DOCUMENTS

| | | | |
|---|---|---|---|
| 0264871 | 4/1988 | European Pat. Off. | 526/318.2 |
| 45-28789 | 9/1970 | Japan | 525/317 |

*Primary Examiner*—John C. Bleutge
*Assistant Examiner*—Vasu S. Jagannathan
*Attorney, Agent, or Firm*—Arthur S. Collins; Joe A. Powell

[57] ABSTRACT

An elasticized, dispersion-grade vinyl chloride resin powder is provided which not only imparts improved elasticity and reduced hysteresis losses to fluid plastisols made therewith, but also has excellent stability under adverse environmental conditions, insuring consistent performance in plastisols even after said powder has been in storage for several months. This resin powder has an average particle size between about 0.4 and about 4 microns and contains between about 0.5 and about 20% by weight of an elastomeric acrylic polymer having a $T_g$ below about $-10°$ C. which is present as discrete particles most of which are at least partly occluded by hard thermoplastic vinyl chloride polymer formed in situ, which vinyl chloride polymer represents substantially all of the remaining mass of said powder.

Fluid plastisols prepared from said resin powder are also described as well as finished articles of improved resiliency and elasticity, which are made from said plastisols. Also disclosed, are preferred methods of preparing said elasticized resin powders.

9 Claims, No Drawings

ELASTICIZED VINYL DISPERSION RESINS HAVING OUTSTANDING STORAGE STABILITY

This invention is concerned with vinyl resins exhibiting excellent performance properties in plastisol applications, including improved elasticity and aesthetic tone (or "feel"), combined with superior shelf life (i.e. resistance to change during storage, shipping etc.). The vinyl resins in question are finely divided dispersion-grade products with particle sizes mostly in the range of about 0.3 to about 5 microns. These are usually made by emulsion polymerization of vinyl chloride, alone or with minor proportions (usually less than about 20%) of compatible vinylidene comonomers.

BACKGROUND OF THE INVENTION

Commercial applications for vinyl dispersion resins most often involve the formulation and processing of fluid dispersions known as plastisols. Plastisols are generally produced by mixing the dry resin into a suitable liquid plasticizer or plasticizer system in such a way as to break-up loose agglomerates and disperse the primary resin particles thoroughly and uniformly.

A multiplicity of plasticizers is available having solvating action toward vinyl resins so that the choice and proportions thereof may be selected in the light of the rheological properties desired for the particular processing technique to be used in fabrication of the end product. In addition to the various substrate coating methods, other important processing techniques include casting, extrusion and several types of molding operations (e.g. rotational, dip and slush).

Although there is some molecular interaction between the vinyl chloride polymer and generally used, compatible plasticizers even at the rather moderate temperatures involved in preparing plastisols, maximum strength is developed in the applied and/or shaped material by heating same to temperatures sufficient to achieve complete mutual solvation of plasticizer and resin, with effective fusion into an integral, solidified polymeric matrix. Temperatures above 300° F. are generally employed (e.g. 325°-400° F.) in order to provide good cures in reasonable times.

Most finished plastisol materials are rather soft and fairly flexible, as these properties can be readily obtained by suitable formulation choices, e.g. the grade of resin used and the type and amount of plasticizer combined therewith. Although the softness and flexibility of vinyl plastisol products is impressive considering the inherent stiffness and hardness of traditional rigid vinyl chloride polymers, their elasticity, resiliency and tactile quality are generally marginal, if not actually deficient, for certain potential end-use applications. A good example of such an end-use is the dip forming of hollow, thin-walled items such as disposable gloves for the medical profession. Such gloves prepared from previous vinyl chloride plastisols are notably deficient in elasticity, pliability and aesthetic tactile qualities when compared to gloves made from natural rubber latex.

One method for obtaining modified vinyl dispersion resins providing improved resilience and elasticity is disclosed and claimed in U.S. application Ser. No. 208,921, filed June 20, 1988 in the name of Ladd J. Horvath and Bela K. Mikofalvy. The improved resins of said application are made by spray drying a latex mixture formed by blending, into an emulsion polymerized vinyl chloride latex, a minor proportion of an acrylic rubber latex derived from the following monomers:

(a) about 80 to about 98 weight parts of alkyl acrylates averaging at least 2 carbon atoms in the alkyl group;
(b) about 1 to about 10 weight parts of unsaturated dicarboxylic acids which contain between 4 and about 8 carbon atoms; and
(c) optionally up to 19 weight parts of compatible, additional unsaturated monomers.

However, the improved resins so prepared exhibit inadequate stability in regard to the rheological properties of plastisol formulations made therefrom. Thus, comparing two freshly mixed plastisols (composed of equal parts by weight of resin and plasticizer), one made with resin freshly prepared in accordance with U.S. Ser. No. 208,921 and the other made with a retained portion of the same resin after a week or more, the viscosity of the latter is typically several fold that of the former (e.g. about 2 to 6 times as much depending largely upon the actual ambient weather conditions.

SUMMARY OF THE INVENTION

The primary object of this invention is to provide more storage-stable, modified vinyl chloride dispersion-grade resins which are still on a par with those of U.S. Ser. No. 208,921 with regard to the resilience and elasticity imparted to plastisol products produced from same.

A secondary objective is to provide such dispersion-grade resins which give outstanding overall performance in plastisol applications, including rheological properties as stable and well balanced as the standard unmodified (and therefore resiliently inferior) vinyl chloride dispersion resins in established commercial use at the present time.

A related object is the provision of practical methods for the dependable and economical manufacture of said improve vinyl chloride resins.

Still other objectives and advantages will be made obvious from the more complete and detailed description and explanation which follows.

The above objectives and advantages are accomplished in accordance with this invention by polymerizing vinyl chloride monomer (optionally with up to about 15% by weight of compatible vinylidene monomers) in an aqueous emulsion in the presence of a minor proportion of a stable preformed acrylic latex containing rubbery solid particles which have a $T_g$ below about $-5°$ C. and an average size between about 0.1 and about 0.4 microns, the total weight of said rubbery particles being equal to between about 0.5% and about 20% of the total weight of monomers charged thereto. The polymerization is made to proceed in controlled manner in the presence of an effective amount of at least one fatty acid soap or synthetic anionic surfactant and at least one free-radical initiator at autogeneous pressures at temperatures in the range of about 30° C. to about 70° C. The reaction mixture is well agitated to insure thorough distribution of said latex particles and to maintain a fine stable emulsion of monomer droplets until most of the monomer is converted into thermoplastic solid matter much of which coats or deposits on particles of said acrylic latex. In this way a stable overpolymerized latex of elasticized vinyl resin is obtained which contains primary particles that are predominantly between about 0.4 and about 4 microns in size, about 0.5% to about 20% of the total dry weight of which is composed of the elastomeric acrylic polymer particles. This elasticized dispersion-grade resin is recovered as a dry powder via the usual dewatering operations, such as spray drying or filtration followed by fluid drying of the wet cake in a suitable fluid energy mill.

Said acrylic latex is a product of emulsion polymerization of the following monomers in admixtures totalling 100 parts by weight:
(a) about 80 to about 98 weight parts of alkyl acrylates averaging at least 2 carbon atoms in the alkyl group;
(b) about 1 to about 10 weight parts of unsaturated dicarboxylic acids which contain between 4 and about 8 carbon atoms; and
(c) optionally up to 19 weight parts of compatible additional unsaturated monomers.

The acrylic latex charged into the vinyl chloride emulsion polymerization process can be varied to provide the rubbery interpolymer particles therein in desired proportions of between about 0.5% and about 20% of the total weight of vinyl monomers introduced. However, the proportion of vinyl monomers that is converted into the finished resin product is seldom much below 80%. This means that the maximum content of rubbery interpolymer material in the elasticized dispersion-grade resin produced will not substantially exceed about 20% by weight. The finished vinyl resin powder products of the instant invention exhibit both improved resiliency and good storage stability over this full range of rubbery interpolymer content (i.e. from about 0.5% to about 20% by weight). However, the higher the proportion of a particular type of rubbery interpolymer incorporated in the finished resin powders, the higher the viscosity level of a given plastisol formulation made therewith will generally be. Therefore, the most suitable plastisol application or specific alternative use for a particular elasticized vinyl dispersion resin product of this invention will depend to a large extent on the type and amount of the acrylic elastomeric component incorporated therein, as will be elucidated more fully later herein.

DETAILED DESCRIPTION OF INVENTION

The acrylic latexes which supply the elastomeric base particles of the present invention may be any stable, preformed acrylic latex containing emulsified submicron elastomeric particles having a $T_g$ below about $-5°$ C. Broadly, said latexes are made by emulsion polymerization of monomer mixtures containing, per 100 parts of total weight thereof, the following monomers:
(a) about 80 to about 98 weight parts of alkyl acrylates averaging at least 2 carbon atoms in the alkyl group;
(b) about 1 to about 10 weight parts of unsaturated dicarboxylic acids which contain between 4 and about 8 carbon atoms; and
(c) optionally up to 19 weight parts of compatible, additional unsaturated monomers.

The optional monomers of (c), which can be used if desired as a supplement or partial substitute for essential monomers (a) and (b) so as to bring the total to 100 parts by weight, can be selected from a wide variety of compatible comonomers provided that the polymer solids of the resulting acrylic latex are soft and rubbery and have a glass transition temperature ($T_g$) substantially below $-5°$ C. Among the more suitable of these supplemental comonomers are monoolefins; vinyl esters, ethers and ketones; vinyl nitriles and amides; vinyl or vinylidene chloride; vinyl aromatics such as styrene; alkyl methacrylates; acrylic acids and amides; alkyl esters or amides of unsaturated dicarboxylic acids; allyl esters, ethers, etc. Dienes such as butadiene and isoprene can also be used in very minor proportions but are less desirable in most monomer mixtures of interest herein.

As long as the proportions of said monomers, i.e. (a) and (b) and optionally (c), can be balanced as specified above to yield an acrylic latex the polymer solids in which have the desired softness and low $T_g$ (e.g. $-10°$ C. or less), there is considerable latitude in the selection of specific monomers of each type. Examples of desirable individual monomers from the alkyl acrylate group (a) are methyl acrylate, ethyl acrylate, propyl acrylate, n-butyl acrylate, isobutyl acrylate, n-pentyl acrylate, isoamyl acrylate, n-hexyl acrylate, 2-methyl pentyl acrylate, n-octyl acrylate, 2-ethylhexyl acrylate, n-decyl acrylate, n-dodecyl acrylate, and the like. Mixtures of two or more individual monomers from group (a) can of course, be employed. Most preferred are those containing 4 to about 10 carbon atoms in the alkyl group (e.g. n-butyl, hexyl, 2-ethylhexyl, etc.).

The unsaturated dicarboxylic acids specified as group (b) are also strongly preferred components. The substitution therefor of unsaturated monocarboxylic acids (such as acrylic or methacrylic) does not produce the optimum balance of properties in the resulting polymer. Useful unsaturated dicarboxylic acids are those containing 4 to 8 carbon atoms per molecule. Especially desirable are such dicarboxylic acid monomers containing 4 to 6 carbon atoms and of course a single carbon to carbon double bond. Outstanding examples include itaconic acid, citraconic acid, mesaconic acid, glutaconic acid, fumaric acid and maleic acid. The anhydrides of such acids, (e.g. maleic anhydride) can still be used since they quickly hydrolyze to the free acid forms. Itaconic acid and fumaric acid are most effective of these lower molecular dicarboxylic acid monomers, but the performance of itaconic acid is particularly outstanding in improving the overall balance of properties of the finished acrylic latex.

The inclusion of itaconic acid or other lower molecular unsaturated dicarboxylic acids of group (b) as specified above significantly improves the strength and resiliency of the elastomeric solids formed in the resulting latex products. In particular, comparative measurements on thin films of raw polymer obtained from latexes made with and without said group (b) monomers show that their presence results in an unusually attractive combination of tensile strength, elongation and retained elasticity. These improved properties appear to be due to the pendant carboxyl groups which are introduced into the acrylic copolymer chain by including these dicarboxylic monomers.

In this regard, the degree of improvement in overall properties of the acrylic elastomer product which is attained by inclusion of a given proportion of a given dicarboxylic acid monomer is also dependant upon when and how said monomer is combined with the other components of the emulsion polymerization process involved. Thus, better results are generally obtained when at least a major portion of said dicarboxylic acid is charged to the primary polymerization zone in combination with at least some aqueous media at the beginning of the active polymerization process and before the other monomers. When a semi-batch process is used wherein some monomers are metered into the ongoing polymerization reaction gradually over a considerable time period of the overall process, no more than about half of the total dicarboxylic acid should be added in this manner. Even when all of the other monomers are added on a delayed, gradual or intermittent schedule, it is still preferred that at least most of the dicarboxylic acid component be present in the polymerizer at the start.

Furthermore, when the 4 to 6 carbon atom dicarboxylic acids like itaconic serve as the (b) group monomers, there is usually no need to employ more than about .8 parts by weight thereof and the optimum charge thereof is about 2 to about 6 parts per 100 parts of total monomers polymerized to make the acrylic latex. Likewise, the optimum proportion of the alkyl acrylate monomers incorporated in said polymerized latex is in the range of about 85 to about 95 parts by weight. In this optimized case, the maximum amount of optional group (c) monomers employed would be restricted to about 12 parts by weight, with the preferred proportion usually being between one and about 8 parts by weight per 100 parts of total monomers copolymerized.

With these preferred proportions, including a maximum of about 10% of the total monomers by weight being chosen from group (c), a soft, low $T_g$ acrylic copolymer product is virtually assured, and the choice of specific individual monomers from group (c) is considerably less critical. In fact, in addition to those potentially suitable individual monomers already listed hereinabove for supplemental group (c), certain multifunctional, crosslinking monomers could well be included in copolymerizing said acrylic latex.

The more preferred crosslinking monomers for incorporation in this manner are monoethylenically unsaturated monomers containing N-methylol groups such as N-methylol acrylamide, or N-methylol derivatives of allyl carbamate which may contain one or two N-methylol groups. The N-methylol groups may be left unreacted or they may be etherified as with $C_1$ to $C_4$ alcohols. The alcohol is released on curing to regenerate the N-methylol group for cure. Alcohol etherifying agents are illustrated by methyl alcohol, ethyl alcohol, isopropyl alcohol, isobutyl alcohol, 2-ethoxyethanol, and 2-butoxy ethanol.

More particularly, the preferred crosslinking monomers are selected from N-alkylol acrylamides that contain from about 4 to about 18, preferably 4 to 12 carbon atoms in the alkyl group, and alkyl acrylamidoglycolate lower alkyl ethers containing from about 7 to about 20 carbon atoms. Specific examples of the particularly preferred crosslinking monomers include N-methylol acrylamide, N-methylol methacrylamide, N-butoxymethyl acrylamide, iso-butoxymethyl acrylamide and methyl acrylamidoglycolate methyl ether. Especially good results have been obtained using N-methylol acrylamide as the crosslinking monomer in amounts of about 0.5 to 2.5 parts by weight per 100 parts of total monomers combined.

Accordingly exemplary, highly preferred acrylic latexes for use in this invention are produced by copolymerizing in an aqueous emulsion about 85 to 95 weight parts of alkyl acrylates, such as n-butyl acrylate, with about 2 to 6 weight parts of an unsaturated dicarboxylic acid, such as itaconic, and about 1 to about 10 weight parts of group (c) monomers including between about 0.5 to 2.5 weight parts of a crosslinking monomer such as N-methylol acrylamide. These copolymerizations may be conducted at temperatures from about 25° to about 100° C., using traditional emulsifying surfactants and in the presence of a compound or combination of compounds capable of initiating the polymerization reaction (e.g. free radical initiators of redox systems).

The solids content of the acrylic latex charged in the vinyl chloride polymerization method of the present invention is not critical, especially since it will be well diluted from the start by the relatively large amount of aqueous medium employed therein. Therefore, any of the usual range of solid contents (e.g. about 25% to 60% by weight), which are conveniently obtained in readily available acrylic latexes, is entirely acceptable herein.

The monomeric charges of vinyl chloride which are polymerized in aqueous emulsion in the presence of minor charges of the above described, preformed acrylic latexes, in accordance with the present invention, can contain between about 85% and 100% vinyl chloride by weight, but those at or close to 100% vinyl chloride are preferred for most purposes. Among the more compatible monomers which can be copolymerized with vinyl chloride are vinyldiene chloride, vinyl acetate, alkyl esters of acrylic acid such as ethyl methacrylate or butyl acrylate, vinyl ethers such as isobutyl vinyl ether, and olefins such as propylene. However, in view of the limited presence and use of such comonomers in the manufacture of generally preferred vinyl dispersion resins, the remaining description of this invention will be directed simply to the homopolymerization of vinyl chloride, even though our invention is not strictly limited thereto.

The polymerization reaction of this invention can be carried out in a batchwise manner in the stainless steel or glass-lined autoclaves conventionally employed in making vinyl dispersion resins. These are usually equipped with heating/cooling jackets and internal multi-bladed agitators and effective wall baffles.

The temperature at which the vinyl chloride polymerization is conducted in the instant process should be regulated within the range of about 30° C. to about 70° C. in accordance with the properties desired in the finished resin powders. For example, the intrinsic viscosity of polyvinyl chloride resins generally varies inversely with the temperature at which they are polymerized. In the present invention, polymerization at temperatures in the range between about 35° and about 55° C. is preferred since excellent, dispersion grade resins having desired properties and consistent quality are obtainable in good yields thereby.

The exact proportions of the acrylic latex charged to the vinyl chloride emulsion polymerization reaction should be regulated so that the total dry weight of the elastomeric particles therein is between about 0.5% and about 20% of the total charge of vinyl monomers employed therein. However, when the acrylic latex is charged in amounts providing more than about 12% of said elastomeric particles on the same basis, the resulting elasticized vinyl chloride resin powder products yield plastisols of a given formulation with somewhat less desirable rheological behavior and generally higher apparent viscosities. Accordingly, for optimum results in most plastisol applications, the preferred charge of acrylic latex should be adjusted to provide between about 1% and about 12% of elastomeric particles based upon the total weight of vinyl monomers charged in the emulsion overpolymerization process. The optimum proportion of said elastomeric particles when desiring elasticized vinyl resin powders for plastisols of maximum fluidity is between about 2% and about 7% by weight based upon the total vinyl monomers used.

It is also preferred that the acrylic latex used be selected or prepared so that the elastomeric solids therein have a $T_g$ between about $-10°$ C. and about $-50°$ C. and preferably between about $-15°$ C. and about $-45°$ C. In addition to selecting the acrylic monomer mixture to be emulsion copolymerized in strict accordance with the teachings already presented herein, it is usually advisable to carry out said emulsion polymerization at temperatures between about 60° and about 80° C. It is also important that the acrylic latex charged be well stabilized using adequate amounts of surfactants/emulsifiers which are compatible with those to be added during the vinyl chloride overpolymerization process, especially if the acrylic latex is one that has been stored for some time instead of being recently or freshly prepared. This special provision further enhances the effectiveness of the acrylic latex particles as sites or nuclei for deposition of the overpolymerized vinyl chloride polymer being formed in-situ.

The aqueous phase of the polymerization system should be made up using deionized water, and the total amount of water charged should not be substantially less than the total monomers charged by weight. Usually, about equal or larger proportions of water are charged, e.g. from about 100 to about 300 parts and preferably between about 120 and about 250 parts per 100 parts of the monomers. It is also preferred that the pH of the aqueous medium be maintained on the alkaline side (i.e. about pH of 7) substantially throughout the polymerization process. Ideally, the pH should be regulated within the range of about 7.5 to about 10.5.

In addition to the acrylic latex, the vinyl chloride monomer and its aqueous vehicle, at least two other functional components play important roles in the successful emulsion polymerization of vinyl chloride in accordance with our invention. These are: (1) one or more water soluble, surface active compounds or emulsifying agents and (2) one or more free-radical generating initiators.

The surface active components can be chosen from a wide variety of known materials traditionally used for polymerizing vinyl chloride in aqueous media. These include anionic compounds such as alkyl sulfate salts (e.g. sodium lauryl sulfate), alkyl sulfonate satls, fatty acid soaps (e.g. potassium stearate), alkaryl sulfonate salts, alkyl phosphate salts, salts of sulfonated dicarboxylate acids (e.g. ammonium dioctyl sulfosuccinate), fatty alcohol sulfates, alkyl ether sulfates, fatty acids and the like. Some nonionic surfactants can also be used such as fatty alcohols, alkoxy derivatives of alcohols, glycols, fatty esters of glycerides, and polyoxy alkyl phenols and the like.

The total amount of surface active components employed herein can be as high as 5 parts per 100 parts of monomer by weight. However, it is preferred that soaps or synthetic anionic compounds serve as the principal surface active agents in the instant process, and that they be used in total proportions of between about 0.5 and about 3 parts by weight per 100 parts of the vinyl chloride monomer charge. Furthermore, most (or even all) of the surfactant used may be charged at the outset, or a substantial portion (or the majority) may be added incrementally or gradually during at least a major part of the time that polymerization is actively underway.

Another vitally important class of functional components whose presence is required in the instant process is that of the polymerization initiators. Although certain azo compounds are also satisfactory, the most prevalent free radical generating initiators are peroxy compounds. These include inorganic compounds such as hydrogen peroxide and the alkali metal and ammonium persulfates, as well as organic compounds such as lauroyl peroxide, t-butyl peroctoate, t-butyl peroxy pivalate, di(2-ethylhexyl)peroxy dicarbonate, cumyl peroxy neodecanoate, acetyl cyclohexane sulfonyl peroxide, and diisopropyl peroxydicarbonate. These peroxy compounds are quite effective even in very low concentrations and can be used herein in total proportions of between about 0.02 and 0.6 parts by weight per 100 parts of total monomer. Preferably, proportions between about 0.04 and about 0.4 parts are employed in our process. The efficiency of the inorganic peroxides can usually be improved considerably by the addition of an activator compound (e.g. a reducing agent to produce a redox system, or a catalytic promoter such as copper sulfate). Such activators or catalysts are normally used in even smaller proportions. For example, copper sulfate is used in proportions of less than about 0.01 part by weight per 100 parts of monomers, and proportions between about 0.0001 and about 0.002 parts are preferred in the present process.

Combinations of two or more individual peroxy compounds of compatible solubility can also be employed. Although we prefer to introduce most if not all of the total charge of initiator constituents near or at the beginning of the instant process, it is also feasible to resort to delayed, incremental additions of one or more of said constituents during the course of polymerization, or to make an occasional supplemental addition if needed to revive or pick up the pace of a laggard reaction batch.

When a monomer soluble initiator system is employed herein, it must be thoroughly premixed, at a temperature below that at which it actively yields free radicals, with most of the charge of demineralized water, as well as at least a major portion of the surfactant components and the liquified monomer charge before being combined with the acrylic latex charge. Preferably, the premix of other components thus produced is subjected to intensive treatment in a homogenizing device before being mixed with the charge of acrylic latex and being heated sufficiently to initiate active polymerization of said monomer thereon.

In addition to the vitally important components discussed herein above, certain non-essential additives may optionally be included to impart special helpful effects provided they do not destabilize or interfere with the efficient accomplishment of the desired emulsion polymerization reaction. These include items like buffers, chain transfer agents, foam suppressors and organic solvents such as are sometimes employed as carriers for organic initiators, etc.

The stable latex of elasticized vinyl dispersion resin obtained from the instant process will usually have a total solids content between about 25% and about 50% by weight, depending largely upon the relative size of the water charge employed and the proportions of the entire monomer charge actually converted into the resinous structure of the finished particles. Recovery of the modified dispersion grade vinyl resin product in the dry powder form usually desired for plastisol applications is readily accomplished in the same types of drying equipment which have been conventionally employed. For example, using standard spray drying equipment operating at temperatures in the range of about 110°–140° C., the fine vinyl resin particles in the finished latex are readily converted to dry, free-flowing powder consisting of loose, easily dispersed aggregates of the individual primary particles.

Indeed, the free-flowing, powdered products obtained by spray drying the elasticized vinyl resins resulting from the instant process are readily dispersible and just as easy to process in most plastisol applications as conventional plastisol grade vinyl chloride resins having substantially equal strength or equivalent inherent viscosity. Accordingly, no significant changes are usually required in procedures, equipment or fomrulations when preparing plastisols from the improved elasticized vinyl chloride powders of our invention or in converting same into finished goods or articles.

Various types of high shear mixing equipment are employed in preparing most plastisols in order to achieve thorough dispersion of the vinyl resin and other compounding ingredients therein. Slow, heavy duty mixers such as sigma-blade, in trough mixers can be used, but more streamlined mixers equipped with higher speed impellers (e.g. the Day-Nauta planetary or the Ross Versa-Mix mixers) are generally preferred today. Mixers equipped with cooling jackets and/or tight covers are often advisable and helpful in avoiding overheating or excessive aeration of the plastisols. Temperatures are preferably controlled within a range of about 75° to about 100° F. during mixing, and deaeration is usually advisable unless the plastisol is to be fabricated into a foam material.

The primary liquid plasticizers used in preparing fluid plastisols from dispersion grade vinyl resins are organic esters of various acids such as phthalic, phosphoric, adipic, sebacic and the like. Of these, the phthalate esters are most frequently used as principal plasticizers for dispersion type vinyl chloride resins. Dialkyl phthalates containing medium length alkyl groups (e.g. from about 6 to about 12 carbon atoms in length) provide a good balance of plastisol properties when used in proportions from about 5 to about 120 parts by weight per 100 parts of the spray dried vinyl chloride resin powder. Specific examples of useful liquid plasticizers include dioctyl phthalate, butyl benzyl phthalate, dioctyl adipate, dibutyl sebacate, dinonyl phthalate and glyceryl stearates.

Depending upon the end-use application intended, various additional ingredients may be included in such plastisols in minor amounts. For example a few parts of specialty plasticizers such as epoxidized soya oil are often used along with similar proportions of heat stabilizers, such as metallic soaps, to provide resistance to thermal degradation. Other optional adjuvants that may be included in some situations include lubricants, pigments, dyes, dispersants, sufactants and various other viscosity regulators including volatile diluents, extenders and viscosity stabilizers.

Plastisols made with the modified dispersion-grade resins of this invention and formulated using about 60 to about 100 parts of suitable primary liquid plasticizers (such as the aforementioned dialkyl phthalates) per 100 parts by weight of resin are very satisfactory for use in various coating processes. The resultant plastisols tend to be somewhat more viscous than directly comparable formulations which are made using an unmodified dispersion-grade vinyl chloride homopolymer resin of substantially the same inherent viscosity. However, a compensating reduction in the viscosity of plastisols made with our internally elasticized vinyl chloride resins can easily be effected by rather minor formulation adjustments. Furthermore, once such an adjustment in initial viscosity has been made, the subsequent thickening and viscosity increases which occur in such plastisols upon standing for a week or so are pretty much in line with those experienced in similar plastisol formulations in regular commercial use today (e.g. generally less than 100%). More importantly and most surprisingly, the shelf life and storage stability of the modified vinyl resins of this invention have proved to be far superior to the modified dispersion resins of copending U.S. application Ser. No. 208,921. Indeed, in this regard they are substantially on a par with most of the unmodified, dispersion-grade homopolymer vinyl chloride resins traditionally employed by the plastisol industry.

The elasticity, feel and dynamic properties of cast films, coatings and shaped articles produced from the overpolymerized, vinyl resin plastisols of this invention are at least as good as those prepared in accordance with U.S. application 208,921 when fused in the same manner at temperatures bettween about 325° and 400° F.

The advantages of the present invention are especially valuable in plastisol applications involving fabrication of hollow, thin-walled articles such as sanitary, disposable gloves by dip forming or mandrel casting techniques. The improved flexibility and the softer, more pleasing "hand" (or feel) imparted to such gloves by using the overpolymerized vinyl chloride resins of this invention in the plastisol composition of the dipping bath instead of the conventional dispersion ngrade vinyl chloride resins are qualities that can be readily detected and appreciated by experienced users, e.g. anyone familar with the major aesthetic differences between disposable (PVC) plastic gloves and high quality rubber (natural latex) gloves.

The following, non-limiting examples further illustrate the invention and some of the advantageous results and benefits obtainable in the practice thereof. In these examples, amounts of ingredients are given in parts "by weight" unless otherwise stated.

EXAMPLE 1

Preparation of Internally Elasticized PVC

Vinyl chloride was polymerized in aqueous emulsion in the presence of a minor proportion of preformed acrylic latex made by emulsion polymerization at a temperature of about 75° C. of a mixture of monomers composed principally of butyl acrylate, plus per 100 total parts, 4 parts of itaconic acid, 6 parts of acrylonitrile and 2 parts of N-methylol acrylamide. The recipe used included the following proportions:

| Ingredient | Parts |
| --- | --- |
| vinyl chloride | 100 |
| demineralized water | 150 |
| acrylic latex* (49%) | 5.2 (2.55 solids) |
| ammonium hyroxide sol. (28%) | 0.22 (0.06 NH$_4$OH) |
| ammonium laurate sol. (7%) | 11.44 (0.8 NH$_4$-laurate) |
| ammonium persulfate | 0.10 |
| copper sulfate | 0.0003 |
| hydrogen peroxide sol. (3%) | 0.013 (0.0004 H$_2$O$_2$) |

*The solid particles of this latex had an aveage particle size of about 0.25 microns and a T$_g$ of about −29° C.)

The copper sulfate, acrylic latex and 148 parts of water were first charged to a clean, jacketed autoclave equipped with multi-bladed agitator. After evacuating the autoclave and assuring absence of leaks, the agitator was started and the liquefied vinyl chloride was introduced. Once the liquid contents had been heated to approximately the desired reaction temperature, the ammonium persulfate and the ammonium hydroxide solution were added, followed by the hydrogen peroxide solution (using the remaining 2 parts of demineralized water to rinse the entry line clean before and after the hydrogen peroxide solution.) While maintaining a temperature of about 43° C. and a pH of at least 9, the progress of the vinyl chloride polymerization was followed by monitoring the total solids content in the aqueous emulsion.

When said total solids content had reached about 7% by weight (about 2.5 hours after charging the hydrogen peroxide solution), gradual addition of the ammonium laurate solution (which had been warmed almost to the reaction temperature) was initiated. Said solution was introduced into the autoclave at a rate of about 1.3 parts/hour (ca 0.09 parts/hr. of ammonium laurate) until a pressure drop of about 15 psi occurred (ca 7 hours later), indicating the end of active polymerization.

After the autoclave had been thoroughly vented to strip off the unreacted vinyl chloride, the finished latex was removed for testing and further processing. About 214 parts of finished latex was recovered which was strained to remove any coagulum (only 0.013 parts recovered, equivalent to about 62 parts per million parts). The solids content of said finished latex was found to be about 38% by weight, and particle size distributions therein (obtained by classification in a Joyce Loebl disc centrifuge apparatus) showed 95% of the solid particles smaller than 1 micron, none larger than about 3 microns with an average size of about 0.6 micron.

This finished overpolymerized latex was easily spray dried using the same equipment and procedures employed in making standard, unmodified, dispersion-grade vinyl resin powders. The fine, free-flowing, white resin powder recovered contained the normal, loose agglomerates most of which dispersed readily when mixed into compatible liquid plasticizers using conventional mixing equipment, (e.g. leaving less than 5% by weight of said dispersed resin powder as particulates of 10 microns or more in size). The acrylic elastomer content was 3% by weight of the dry powder.

EXAMPLES 2A, 2B and 2C

Using Larger Proportions of Acrylic Latex

Additional emulsion polymerizations of vinyl chloride were carried out in the presence of the same preformed acrylic latex as in Example 1 except that larger proportions of the latex were charged to the autoclave. The only significant changes in the recipe and/or procedures used in these polymerizations can be summarized as follows:

| Run 2A | |
|---|---|
| acrylic latex | 10.4 parts (5.1 solids) |
| ammonium persulfate | 0.15 parts |
| copper sulfate | 0.0004 parts |
| hydrogen peroxide sol. | 0.02 parts (0.0006 $H_2O_2$) |
| Run 2B | |
| acrylic latex | 20.8 parts (10.2 solids) |
| ammonium persulfate | 0.2 parts |
| copper sulfate | 0.0005 parts |
| hydrogen peroxide sol. | 0.026 parts (0.0008 $H_2O_2$) |
| Run 2C | |
| acrylic latex | 36.4 parts (17.85 solids) |
| ammonium persulfate | 0.3 parts |
| copper sulfate | 0.0006 parts |
| hydrogen peroxide sol. | 0.04 parts (0.0012 $H_2O_2$) |

The main change in procedure in conducting these polymerizations was in the trigger points for initiating the gradual addition of the ammonium laurate solution. Because of the larger amounts of acrylic latex solids charged initially in runs 2A, 2B, and 2C, the total solids contents of the reaction mixture at which introduction of said solution began were about 8%, 10% and 13% by weight respectively.

The finished latexes recovered from these three runs were not significantly different from that in Example 1, although the total solids contents were somewhat higher (i.e. about 40% to 43% by weight). Furthermore, in spite of the higher contents of elastomeric acrylate material in said solids (namely 6%, 11% and 17% by weight), latexes 2A, 2B and 2C were still readily processed in regular spray drying equipment to form free-flowing, white resin powders. Although these powders were somewhat coarser and contained more large agglomerates than the powder product of Example 1, they were still acceptable for use in making plastisols by intensive, high shear mixing of same with suitable liquid plasticizers.

EXAMPLE 3

Preparation of Fluid Plastisols

Each of the freshly spray-dried resin powders produced in Example 1 and Examples 2A, 2B and 2C were placed in dry, sealed drums kept at normal room temperatures. After 2 to 3 weeks, portions of each of said four powders were removed and used to prepare fluid plastisols from each powder according to the following standard formulation:

100 parts of resin powder
100 parts of phthalate ester plasticizer[1]
5 parts of epoxidized soya oil
5 parts of SYNPRON *231 (Ca/Zn stabilizer)

[1]A mixed ($C_7$ to $C_{11}$) dialkyl ester sold by BASF Corp. under the trade name PALATINOL 711-P
*Trademark of Synthetic Products Co.

Most of the unused portions of said four powders were then placed in shallow open containers to undergo accelerated aging in a controlled environment maintained at 100° F. and 80% relative humidity. At the end of every week for a period of six weeks a portion of each said four powders was removed from said controlled environment and used to prepare plastisols of the same standard formulation. The low shear viscosities of all of the resulting fresh plastisols, were determined at about 23° C. in accordance with procedure SPI-VD-T1(1959) of The Society of the Plastics Industry, Inc., using a Brookfield Viscosimeter (Spindle 6 at 2 rpm). The results of all of these viscosity measurements reported in centipoises are tabulated below.

| FRESH PLASTISOL VISCOSITIES FOR AGED RESINS | | | | |
|---|---|---|---|---|
| | Ex. 1 | Ex. 2A | Ex. 2B | Ex. 2C |
| Days of | | Content of Acrylic Elast. | | |
| Accel. Aging | (3%) | (6%) | (11%) | (17%) |
| 0 | 1500 | 1700 | 9,400 | 34,000 |
| 7 | 1400 | 2450 | 12,200 | 40,000 |

-continued

FRESH PLASTISOL VISCOSITIES FOR AGED RESINS

| Days of Accel. Aging | Ex. 1 (3%) | Ex. 2A (6%) | Ex. 2B (11%) | Ex. 2C (17%) |
|---|---|---|---|---|
| | | Content of Acrylic Elast. | | |
| 14 | 1750 | 2600 | 10,400 | 150,000 |
| 21 | 1700 | 2650 | 10,200 | 210,000 |
| 28 | 1700 | 2400 | 12,800 | TOO |
| 35 | 1500 | 2450 | 9,800 | HIGH TO |
| 42 | 1600 | 2250 | 10,000 | MEASURE |

These results show that the resin powder of Example 2C, which contains about 17% weight of elastomeric acrylic polymer, is the only one of these four experimental products which exhibits more than minor increases in the fresh standard plastisol viscosities even following their subjection to the very severe aging conditions of this example. However, even this product of Example 2C would be useful for certain heavy plastisol applications such as thick coatings (e.g. in belting, sheet insulation, or mats) as well as in mastic or caulking products. Furthermore, it should be noted that the accelerated aging conditions of this example are estimated to be about four times as severe as normal environmental storage conditions encountered on average during a year's time.

In order to provide a more meaningful standard of comparison for the excellent stability of the dispersion-grade resin powders of this invention, samples of GEON® 121×10, (a commercial, dispersion-grade vinyl chloride homopolymer resin) and of a modified, dispersion-grade resin powder made to contain 3% elastomeric acrylic polymer in accordance with Example 1 of U.S. Ser. No. 208,921 (except using the same acrylic latex as in present Example 1) were subjected to the same accelerated aging tests described immediately hereinabove. The resulting low shear viscosities of fresh standard plastisols made with these 2 additional resins periodically over six weeks of such aging were as follows:

| Days of Accel. Aging | *GEON 121 × 10 Resin (0%) | Modified Resin made per U.S. Ser. No. 208,921 (3%) |
|---|---|---|
| | Content of Acrylic Elast. | |
| 0 | 700 | 2,700 |
| 7 | 1400 | 40,000 |
| 14 | 1550 | 59,000 |
| 21 | 2000 | 54,000 |
| 28 | 1700 | 64,500 |
| 35 | 1700 | 47,500 |
| 42 | 1550 | 58,000 |

*Trade Mark of the B. F. Goodrich Co.

It will be seen from these figures that the storage stability and general level of low shear plastisol viscosities of the commercial GEON ® resin is substantially on a par with those of Examples 1 and 2A hereinabove. However, the acrylic latex modified vinyl chloride dispersion resin made by the method disclosed in U.S. Ser. No. 208,921 undergoes major changes when stored under conditions involving both elevated temperatures and high humidity, as indicated by at least an order of magnitude increase in viscosity of standard plastisols made therewith after only one week of such storage.

EXAMPLE 4

Mechanical Testing of Fused Plastisols

The standard fluid plastisols made from the experimental resins of Examples 1 and 2B hereof as well as the unmodified commercial resin, GEON 121×10, (prior to any accelerated aging of said resins, all as described in Example 3 hereof) were heat fused in cylindrical molds at 350° F. to form solid, cured, disk-shaped specimens of uniform thickness. The dynamic visoelastic properties of said specimens were then evaluated using the Rheometrics Mechanical Spectrometer described in Example 3 of USSN 208,921. The testing was conducted at room temperature in the manner specified in said copending U.S. application except that the torsional amplitude was fixed to provide a dynamic strain of 0.7%.

The shear storage modulus (G') and shear loss modulus (G") values thus determined on fused specimens of the plastisols made from each of said three resins are reported for the usual range of torsional frequencies in the following summary of results.

| | Cured Plastisol Specimens Made With: | | | | | |
|---|---|---|---|---|---|---|
| (acrylic content)→ Oscillatory | GEON 121 × 10 (0%) | | Ex. 1 Resin (3%) | | Ex. 2B Resin (11%) | |
| Frequency (rads/sec) | G' (Bars) | G" (Bars) | G' (Bars) | G" (Bars) | G' (Bars) | G" (Bars) |
| $10^{-2}$ | 6.0 | 0.27 | 5.0 | 0.19 | 4.6 | 0.19 |
| $10^{-1}$ | 6.6 | 0.28 | 5.4 | 0.20 | 5.0 | 0.19 |
| $10^0$ | 7.1 | 0.32 | 5.9 | 0.25 | 5.35 | 0.21 |
| $10^1$ | 7.7 | 0.5 | 6.4 | 0.43 | 5.8 | 0.38 |
| $10^2$ | 8.6 | 1.20 | 7.4 | 1.00 | 6.6 | 0.80 |

From the results tabulated above, a direct comparison can be made between the dynamic modulus values for the experimental resins of Examples 1 and 2B and the corresponding values obtained using the commercial resin plastisol. These comparisons show that both the storage modulus (G') and the shear loss modulus (G") are consistently lower for the elasticized resins of this invention. Thus, for the fused specimens made from the Example 1 resin, the G' values average only 83%, while the G" values average only about 78% of the corresponding values for the same plastisol formulation made with unmodified GEON 121×10.

Similarly, even greater differences are found in the G' and G" values for the specimens made with Example 2B resin. Thus, these G' and G" values run only about 77% and about 70% respectively of the corresponding values for specimens made with commercial GEON 121×10 resin. These results demonstrate the reduction in hysteresis losses and the improved elasticity and tone which can be achieved in plastisol products made with the elasticized dispersion-grade resin powders of this invention. It will also be seen that these dynamic modulus results for the resin of Example 1 are on a par with those obtained in Example 3 of USSN 208,921 for a dispersion-grade resin made by spray drying a physical mixture of a vinyl chloride latex with sufficient acrylic latex to produce a 3% by weight concentration of acrylic elastomeric solids in the finished powder product.

More changes and substitutions can, of course, be made in the above illustrative examples. For example, other primary liquid plasticizers, such as didecyl phthalate, dioctyl adipate and diundecyl phthalate can be used in place of all or part of the Palatinol ™ 711-P in the plastisols described. Likewise, up to about 50% by weight of the resin powder in such a plastisol could be an ordinary (i.e. unmodified) dispersion-grade resin (such as GEON 121×10), and/or a minor proportion of a blending resin or similar, somewhat coarser, extender resins could be added in such formulations.

While the present invention has been described in conjunction with certain specific embodiments, many additional modifications and variations will be made evident to those skilled in the art by the teachings contained herein. Accordingly, it is intended that all such modifications and variations which fall within the spirit and scope of said teachings will be covered by the claims appended hereto.

What is claimed is:

1. An elasticized, dispersion-grade vinyl chloride resin powder having an average particle size between about 0.4 and about 4 microns and providing consistently outstanding performance in fluid plastisols even when said powder is not used to make a plastisol for several months, said powder containing between about 0.5% and about 20% by weight of discrete solid particles of elastomeric acrylic polymer material produced by emulsion polymerization of a comonomer mixture including, per 100 parts by weight of total comonomers, a combination of:
   (a) about 80 to about 98 weight parts of alkyl acrylates averaging at least 2 carbon atoms in alkyl group;
   (b) about 1 to about 10 weight parts of unsaturated dicarboxylic acids which contain between 4 and about 8 carbon atoms; and
   (c) optionally up to 19 weight parts of compatible additional unsaturated monomers;
said solid particles being at least partly coated or occluded by hard thermoplastic vinyl chloride polymer formed in situ in their presence by emulsion polymerization of monomer material containing less than 15% by weight of monomers other than vinyl chloride, said vinyl chloride polymer representing substantially all of the remaining mass of said powder.

2. Dispersion-grade vinyl chloride resin powder as described in claim 1 wherein said elastomeric acrylic polymer material is the product of emulsion copolymerization per 100 parts by weight of total monomers of the following:
   (a) about 85 to about 95 weight parts of alkyl acrylates averaging at least 2 carbon atoms in the alkyl groups thereof;
   (b) about 2 to about 6 weight parts of monounsaturated dicarboxylic acids which contain from 4 to 6 carbon atoms; and
   (c) up to about 12 weight parts of compatible, additional unsaturated monomers.

3. Dispersion-grade vinyl chloride resin powder as described in claim 2 wherein said elastomeric acrylic polymer material has a $T_g$ between about $-15°$ and about $-45°$ C. and the compatible additional unsaturated monomers in (c) constitute up to about 10 weight parts per 100 parts of total monomers copolymerized.

4. Dispersion-grade vinyl chloride resin powder as described in claim 3 wherein the compatible additional monomers in (c) constitute between 1 and about 10 weight parts and include at least 0.5 weightparts of multifunctional, crosslinking monomers containing one or more N-methylol groups or etherified N-methylol groups.

5. Dispersion-grade vinyl chloride resin powder as described in claim 4 wherein said additional monomers in (c) include between about 0.5 and about 2.5 weight parts of N-methylol acrylamide and said dicarboxylic acid in (b) is itaconic acid.

6. Dispersion-grade vinyl chloride resin powder as described in claim 4 wherein said hard thermoplastic vinyl chloride polymer is essentially a homopolymer and the proportion of said elastomeric solid acrylic polymer material contained therein is between about 1% and about 12% by weight.

7. Dispersion-grade vinyl chloride resin powder as described in claim 2 wherein most of the alkyl groups of said alkyl acrylates in (a) contain between about 4 and 10 carbon atoms per alkyl group.

8. Dispersion-grade vinyl chloride resin powder as described in claim 5 wherein said powder contains between about 1% and about 12% of sad elastomeric acrylic polymer material and substantially all of said discrete solid particles are smaller than 0.5 microns.

9. Dispersion-grade vinyl chloride resin powder as described in claim 8 wherein said powder contains between about 2% and about 7% of said elastomeric acrylic polymer material.

* * * * *